United States Patent [19]

Manfroni

[11] Patent Number: 4,711,376
[45] Date of Patent: Dec. 8, 1987

[54] DISPENSING PISTON-COCK FOR ICE CREAM MAKING MACHINES

[75] Inventor: Ezio Manfroni, Sasso Marconi, Italy

[73] Assignee: Carpigiani Bruto Macchine Automatiche, Italy

[21] Appl. No.: 885,680

[22] Filed: Jul. 15, 1986

[30] Foreign Application Priority Data

Jul. 26, 1985 [IT] Italy .................... 15217/85[U]

[51] Int. Cl.⁴ .................................................. B67D 5/62
[52] U.S. Cl. ............................. 222/146.1; 62/342; 99/452; 222/509; 222/559
[58] Field of Search ............ 222/146.1, 146.2, 146.6, 222/146.5, 505, 509, 559; 62/342, 343; 251/368; 137/375; 99/452

[56] References Cited

U.S. PATENT DOCUMENTS

| | | | |
|---|---|---|---|
| 2,156,518 | 5/1939 | Titus | 222/509 |
| 2,737,024 | 3/1956 | Swenson | 62/342 X |
| 3,052,381 | 9/1962 | Carpigiani | 222/571 X |
| 3,698,206 | 10/1972 | Werner | 62/342 |
| 3,868,050 | 2/1975 | Gorychka et al. | 222/509 |
| 4,476,146 | 10/1984 | Manfroni | 62/342 X |

*Primary Examiner*—Joseph J. Rolla
*Assistant Examiner*—Kevin P. Shaver
*Attorney, Agent, or Firm*—Larson and Taylor

[57] ABSTRACT

A dispensing piston-cock for ice-cream machines comprises a baseplate and a cylinder, both made of plastic material. The cylinder is open at one end and has an ice-cream dispensing hole at the opposite end which is integral with the baseplate. A communication duct formed in the baseplate opens near the lower end of the cylinder and a piston is slidably mounted in the cylinder to reciprocate from a first position where it closes the communication duct and a second position at which the lower end of the piston is raised above the communication duct. The lower portion of the piston at least up to a height to cover the communication duct in the lower position of the piston is covered by a metal jacket.

5 Claims, 1 Drawing Figure

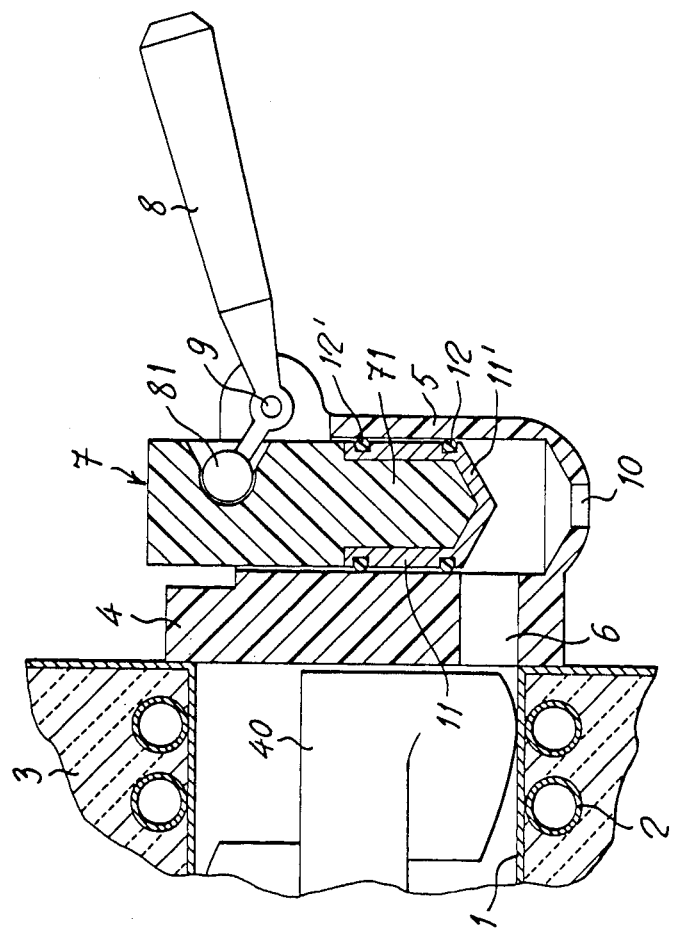

DISPENSING PISTON-COCK FOR ICE CREAM MAKING MACHINES

FIELD OF THE INVENTION

This invention relates the a piston-cock devices for dispensing ice cream, which are mounted on ice-cream making and dispensing machines.

BACKGROUND OF THE INVENTION

Generally, these known devices are mounted on (or made integral with) a bedplate which closes the front side of the freezing cylinder of an ice-cream making machine, and comprise a cylinder member communicating, in proximity of its lower end, via a radial duct extending through said baseplate, with the freezing chamber. The said cylindrical member is open at both ends and is formed at its bottom with a suitably shaped dispensing hole. A piston, slidably fitted in said cylindrical member, is reciprocable through suitable control means (usually, a lever pivotably secured by one end to the upper region of said cylindrical member), from a first or lowered position wherein the lower end of said piston closes both said communication duct and said dispensing hole in the bottom of the cylindrical member, to a second or raised position wherein the lower end of said piston is raised to a level above said communication duct so as to allow the free flow of ice-cream from the freezing chamber outwards through the dispensing hole in the bottom of the said cylindrical member, or cylinder.

The piston-cock dispensing devices of the type mentioned above are classified either as simple dispensers, wherein one piston-cock closes and controls the outfow from one single freezing cylinder of the machine, and multiple dispensers, or "mixers" wherein between each pair of dispensing cocks controlling the outflow from two side-by-side cylinders of one ice-cream making machine, a third dispensing cock is interposed communicating at its bottom with both cylinders of the ice-cream making machine in order to dispense a mixed-flavor ice-cream through its dispensing hole.

Dispensing piston-cocks for ice-cream machines, made entirely of metal, are known, for example, from U.S. Pat. No. 2,737,024. However, such a dispensing cock (comprising a closure plate, a cylinder and a piston) made entirely of metal involves a number of disadvantages, one of which being that, due to the high thermal conductivity of metal, an excessive transfer of cold to the entire dispensing cock takes place, with resulting thermal losses outwards and formation of condensate and frost on said dispensing cock.

In order to overcome the above and other disadvantages of the above mentioned prior art ice-cream dispensing cocks, it has been proposed, as described in the Italian Pat. Nos. 599,450 and 621,459 to Poerio Carpigiani (corresponding to U.S. Pat. No. 3,052,381) to make such dispensing devices (baseplate, cylinder or cylinders, and piston or pistons) entirely of plastics material. Thus, thanks to the insulating characteristics of plastics, this dispensing device avoids, inter alia the thermal loss outwards from the freezing chamber and the formation of frost or of frozen condensate on the dispensing device and parts associated therewith.

This construction has involved a real technological revolution in the field of ice-cream making machines and has been fully successful, whereby it may be stated that all dispensing devices of the kind set forth above are presently made of plastics, in accordance with the teachings of the above mentioned patents to Carpigiani.

Upon the development of the latest ice-cream making machines, for example the machine described in the Italian Patent Application Ser. No. 12451 A/81, or in the U.S. Pat. No. 4,476,146 to Ezio Manfroni, wherein a pasteurizing proper of the ice-cream mix and of the frozen product therein is performed intermittently in the ice-cream mix feeding tank and in the freezing cylinder of the machine by heating them up to pasteurizing temperature and subsequent cooling, in order to prevent the formation, multiplication and growth of pathogenetic germs in the ice-cream machine, the problem has arisen of the simultaneous sterilization of the ice-cream dispensing elements which are associated with the freezing chamber of the said machines.

In fact, the above mentioned prior-art dispensing devices made of plastics material, just due to their thermal insulating characteristics that have caused their full success with the traditional ice-cream making machines, hindered the transfer of heat to the area of the device between the lower end of the dispensing cylinder and the lower end of the dispensing piston, whereat a thin layer of ice-cream is usually stagnant, thus hindering a thorough sterilisation of all the portions of the machine contacted by the flow of ice-cream.

SUMMARY OF THE INVENTION

Therefore, the main object of this invention is to provide a dispensing piston-cock for ice-cream making machines of the type mentioned above, in which, during the pasteurization process performed within ice-cream making machines of the kind for instance described in the U.S. Pat. No. 4,476,146, an effective thermal heat transfer is also effected to all the parts of the dispensing device contacted by the flow of ice cream, yet without modifying the characteristics of simple construction and thermal insulation from the outer ambient which are peculiar of the prior art dispensing piston cocks of the kind described in U.S. Pat. No. 3,052,381.

According to a main characteristic of the invention, said object is achieved by constructing at least the lower end portion of the piston of a dispensing cock of the kind mentioned above, at least partially of metal.

In a preferred embodiment of the invention, this is attained by sheathing with a heat-conducting metal at least the lower end portion of the plastic piston which closes the communication duct with the freezing chamber of the ice-cream making machine.

An excellent heat transfer is thus obtained between the freezing chamber and said end portion of the piston and the surrounding plastics cylinder walls, such as to permit, particularly during the sterilization step of the machine, when the ice-cream mixture is heated to a pasteurizing temperature, the transfer of the pasteurizing heat to said portions of the dispensing piston and to the parts associated therewith, for example to the sealing rings disposed on said piston and to the surrounding cylinder walls, so as to achieve a complete sterilization of all the portions of the dispensing cock contacting the ice-cream being dispensed.

The metallic sheating of the lower portion of the piston may be, advantageously, in the form of a copper jacket suitably plated with a corrosion-proof material, such as chromium.

Said copper jacket may be of any suitable thickness, a preferred thickness being about 15 mm.

Advantageously, said metallic jacket has formed therein grooves for accomodating the sealing rings which are commonly required between piston and cylinder.

BRIEF DESCRIPTION OF THE DRAWING

Further characteristics and advantages of this invention will be apparent from the following description of a preferred embodiment thereof, made with reference to the accompanying drawing, wherein the single FIGURE is a diagrammatic longitudinal sectional partial view of the front end of a freezing chamber of an ice-cream making machine having affixed thereto a plastics closure plate or door provided with the dispensing cock according to the invention.

DESCRIPTION OF THE PREFERRED EMBODIMENT OF THE INVNETION

With reference to the FIGURE of the drawing, 1 is the freezing cylinder of an ice-cream making machine of the so called "self-pasteurizing" type. The cylinder 1 is surrounded exteriorly by a pipe coil 2 wherein a refrigerating fluid from a suitable refrigerator (not shown) is circulated during the freezing step, and a heating fluid, for example, either the compressed refrigerating fluid (as described in my U.S. Pat. No. 4,476,146) or any other suitably-heated fluid, is circulated during the pasteurizing step. Both the coil 2 and the cylinder 1 are incorporated in a suitable insulating material 3.

Mounted within the cylinder 1 is a stirrer/mixer device 40 actuated by a suitable motor (not shown).

The front end of the freezing cylinder 1 is closed by a suitable door 4 of plastics material wherein the cylinder 5 is formed as an integral unit. Formed through the door 4 is a duct 6 communicating radially with the lower end portion of the cylinder 5. The cylinder 5 is open at the top end thereof and is formed at the bottom end with a through hole 10 for dispensing ice-cream.

Axially slidably mounted in the cylinder 5 there is a piston 7, and a control lever 8 is pivoted at 9 to the upper portion of the cylinder 5 and is provided with an extension 81 which engages a suitable recess in the upper portion of the piston 7 in order to reciprocate said piston within the cylinder 5 from a first position wherein it closes the hole 6 which puts the freezing cylinder 1 into communication with the cylinder 5, to a second position (shown in the Figure) wherein it is clear of said communication hole, thus permitting the ice-cream to flow from the freezing cylinder 1, through hole 6, the lower portion of the cylinder 5 and the dispensing hole 6 to the outside.

According to the present invention, the lower end portion 71 of the piston 7, i.e. the portion of the piston that, in the closed position, intercepts the communication duct 6 from the freezing cylinder 1 to the cylinder 5, is of reduced diameter, and a jacket 11 made of a heat-conducting metal such as copper or aluminum is fitted on the said reduced-diameter portion 71.

The metal jacket 11 has formed therein two annular grooves for accomodating the sealing rings 12, 12' which will be located, in the closed position of the piston 7, downstream and upstream, respectively, of the region of the cylinder 5 comprising the communication port 6. Advantageously, said metal jacket 11 also extends around the bottom end of the piston 7, as shown by 11' in the drawing.

The metal jacket 11 may be of any suitable thickness, ranging from few millimeter (2–3 mm) to few centimeters, depending also upon the diameter of the piston 7. However, for the purposes of the invention, a conducting metal wall thickness of about 15 mm for the jacket 11 has shown itself particularly satisafctory. If said jacket is made of copper (or brass), it will be preferably covered by a chromium electroplating, so as to make it corrosion-proof.

The operation of the above described device will be now apparent. During the heating step of the frozen mixture in the cylinder 1, the pasteurizing heat will be effectively transferred from the heated liquid contained in cylinder 1 and in duct 6, through the metal jacket 11, to the entire peripheral surface of the lower portion of piston 7 that is contacted by the ice cream and to the seats for the sealing rings 12 and 12', as well as to the surrounding portions of the cylinder 5, thus effecting the sterilization of all these parts. During the cooling step, cold will be similarly transferred to said parts. Since according to the embodiment shown jacket 11 extends also to the pointed end 11', the further advantage is obtainend to avoid, during the time interval between successive dispensing operations, the melting of any ice-cream residue left over sticking to the said pointed end, by virtue of a stronger transfer of cold to said pointed end, thus minimizing the possibility of dripping.

Although the piston 7 has been described and shown as made of plastics material and provided with a metal jacket, and although this is the preferred embodiment of my invention, it is apparent that the same results, or similar results may be obtained as well by constructing the lower portion of the piston (or, if desired, the entire piston) entirely of metal.

I claim:

1. In a dispensing piston-cock for use in ice-cream machines having means for heating the ice-cream mix to a pasteurizing temperature, and means for refrigerating the ice-cream mix, and of the kind comprising a baseplate made of plastics material; a cylinder made of plastics material open at its upper end and provided with an ice-cream dispensing hole at its opposite or lower end; said cylinder being integral with or formed in said baseplate; at least one communication duct formed in said baseplate and opening in proximity of the lower end of said cylinder; a piston made of plastics material slidably mounted in said cylinder; at least two spaced sealing rings on the lower end portion of said piston; means for reciprocating said piston in said cylinder from a first position wherein it closes said communication duct with its lower end portion, to a second position wherein its lower end portion is lifted above said communication duct; the improvement according to which the said piston is covered at least over its lower end portionn by a metal jacket, which metal jacket extends up along the piston to a height above the communication duct so that the jacket covers the communication duct when the piston is in said first position at which it covers the communication duct, such that during the heating of the ice-cream mix the heat is conducted, by means of said metal jacket, to the interior walls of the cylinder.

2. A dispensing cock according to claim 1, in which the said metal jacket is provided with grooves accommodating the said spaced sealing rings.

3. A dispensing cock according to claim 1, in which said metal jacket is a copper jacket.

4. A dispensing cock according to claim 1, in which said metal jacket is an aluminum jacket.

5. A dispensing cock according to claim 1, in which the said metal jacket has a wall thickness of from 2 to 20 mm.

* * * * *